US009104636B2

(12) United States Patent
Nonogaki

(10) Patent No.: US 9,104,636 B2
(45) Date of Patent: Aug. 11, 2015

(54) PROCESSOR, MULTIPROCESSOR SYSTEM, AND METHOD FOR CAUSING MEMORY MANAGING APPARATUS TO MANAGE SHARED MEMORY

(75) Inventor: Nobuhiro Nonogaki, Tokyo (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 1214 days.

(21) Appl. No.: 13/027,482

(22) Filed: Feb. 15, 2011

(65) Prior Publication Data

US 2012/0102274 A1 Apr. 26, 2012

(30) Foreign Application Priority Data

Oct. 26, 2010 (JP) .................................. 2010-239488

(51) Int. Cl.
*G06F 12/00* (2006.01)
*G06F 15/167* (2006.01)

(52) U.S. Cl.
CPC .................................... *G06F 15/167* (2013.01)

(58) Field of Classification Search
CPC .................................................. G06F 15/167
USPC .......................................................... 711/147
See application file for complete search history.

(56) References Cited

U.S. PATENT DOCUMENTS

| 2001/0013090 A1* | 8/2001 | Sandstrom ..................... 711/147 |
| 2008/0034168 A1* | 2/2008 | Beaman ......................... 711/154 |
| 2008/0168210 A1* | 7/2008 | Lee et al. ...................... 711/100 |
| 2009/0193212 A1 | 7/2009 | Kodaka |

FOREIGN PATENT DOCUMENTS

| JP | 2009-181213 | 8/2009 |
| JP | 2009-181268 | 8/2009 |

* cited by examiner

*Primary Examiner* — Larry Mackall
(74) *Attorney, Agent, or Firm* — White & Case LLP

(57) ABSTRACT

A memory managing apparatus manages a memory shared by processors. The apparatus includes an allocator, an updater and a releaser. The allocator secures a memory area in the memory allocated to each processor based on a request of each processor and registers reference counters corresponding one-to-one to the processors. The updater adds 1 to a value of the reference counter corresponding to the processor managing the memory area when the memory area is allocated to each processor and subtracts 1 from the value of the reference counter corresponding to the processor managing the memory area when the memory area is released from the processor to which the memory area is allocated. The releaser releases the memory area from the processor to which the memory area is allocated when a sum of the values of the reference counters in the memory area updated by the updater is 0.

11 Claims, 17 Drawing Sheets

```
AUentry * split(scale) {
  if(scale >= AU_MAX_SCALE) return NULL;
  auentry = FREE[scale];
  if(auentry != NULL) {
    auentry->next = FREE[scale].next;  auentry->prev = &FREE[scale];
    auentry->next->prev = auentry;  auentry->prev->next = auentry;
    return au;
  }
  if(scale == AU_MAX_SCALE - 1) return NULL;
  auentry = split(scale + 1);
  buddy = au + sizeof(AUentry) * (2 << scale);
  auentry->S = scale;
  buddy->S = scale;
  buddy->U = 0;
  buddy->next = FREE[scale].next ;  buddy->prev = & FREE[scale] ;
  buddy >next->prev = buddy;  buddy >prev->next = buddy;
  return auentry;
}
```

FIG. 11

```
void merge(auentry, scale) {
    if(scale == AU_MAX_SCALE -1) {
        auentry->next = FREE[scale].next;   auentry->prev = &FREE[scale];
        auentry->next->prev = auentry;      auentry->prev->next = auentry;
        return;
    }
    index = (auentry - auentry_head) / sizeof(AUentry)
    buddy_index = index ^ (1 << scale);
    buddy = auentry_head[buddy_index];
    if(buddy->U == 1 ) {
        auentry->next = FREE[scale].next;   auentry->prev = &FREE[scale];
        auentry->next->prev = auentry;      auentry->prev->next = auentry;
        return;
    } else {
        buddy->next->prev = buddy->prev;  buddy->prev->next = buddy->next;
        if(buddy_index < index) {
            merged_auentry = buddy;
        } else {
            merged_auentry = auentry;
        }
        merged_auentry->S = scale + 1;
        merge(merged_auentry, scale + 1);
        return;
    }
}
```

FIG. 19

PROCESSOR, MULTIPROCESSOR SYSTEM, AND METHOD FOR CAUSING MEMORY MANAGING APPARATUS TO MANAGE SHARED MEMORY

CROSS REFERENCE TO RELATED APPLICATIONS

This application is based upon and claims the benefit of priority from the prior Japanese Patent Application No. 2010-239488, filed on Oct. 26, 2010, the entire contents of which are incorporated herein by reference.

FIELD

The present invention relates to a memory managing apparatus, a multiprocessor system, and a method for causing memory managing apparatus to manage a shared memory.

BACKGROUND

Recently, a multiprocessor system including a shared memory and plural processors is used to process large-capacity data such as image data. In such multiprocessor system, it is necessary to satisfy the following first to sixth requirements.

<First requirement> Allocation and release of the shared memory are mutually exclusive among processors.

<Second requirement> A 16 KB to 12 MB memory area is secured in the shared memory with respect to one piece of data. For example, it is necessary to secure the at least 1.3 MB continuous memory area in the shared memory with respect to image data having 1280 by 720 pixels.

<Third requirement> The shared memory can properly be allocated even if pieces of data having different sizes are mixed. For example, in order to simultaneously deal with image data of 16 KB for static image and image data of 12 MB for moving image, it is necessary to properly allocate the shared memory even if the image data of 16 KB and the image data of 12 MB are mixed.

<Fourth requirement> Fragmentation of the shared memory can be prevented. Particularly, in the case that large-capacity data such as the image data is dealt with, the fragmentation tends to be easily generated because of a large ratio of a data capacity to a capacity of the shared memory. Accordingly, it is important to prevent the fragmentation in order to deal with the large-capacity data such as the image data.

<Fifth requirement> The number of data copy times is decreased. Particularly, in the large-capacity data such as the image data, an amount of data transferred between the shared memory and the processor is increased when the data is copied. Accordingly, it is important to decrease the number of data copy times in order to reduce a load on the multiprocessor system.

<Sixth requirement> Alignment between a boundary of a size (for example, 256 bytes or 1024 bytes) requested by a DMA (Direct Memory Access) module and a head address of data is established when the data is transferred with the DMA module. For example, in the case that the head address of the data is "0x400100", the alignment is established at the boundary of a unit (256 bytes) requested by the DMA module, thereby improving data transfer efficiency.

However, the conventional memory managing apparatus does not satisfy all the first to sixth requirements.

BRIEF DESCRIPTION OF THE DRAWINGS

FIG. 11 illustrates the pseudo code indicating a procedure of dividing.

FIG. 19 illustrates the pseudo code indicating a procedure of merging.

DETAILED DESCRIPTION

Embodiments will now be explained with reference to the accompanying drawings.

In general, according to one embodiment, a memory managing apparatus manages a memory shared by processors. The apparatus includes an allocator, an updater and a releaser. The allocator secures a memory area in the memory allocated to each processor based on a request of each processor and registers reference counters corresponding one-to-one to the processors. The updater adds 1 to a value of the reference counter corresponding to the processor managing the memory area when the memory area is allocated to each processor and subtracts 1 from the value of the reference counter corresponding to the processor managing the memory area when the memory area is released from the processor to which the memory area is allocated. The releaser releases the memory area from the processor to which the memory area is allocated when a sum of the values of the reference counters in the memory area updated by the updater is 0.

Figure 1:
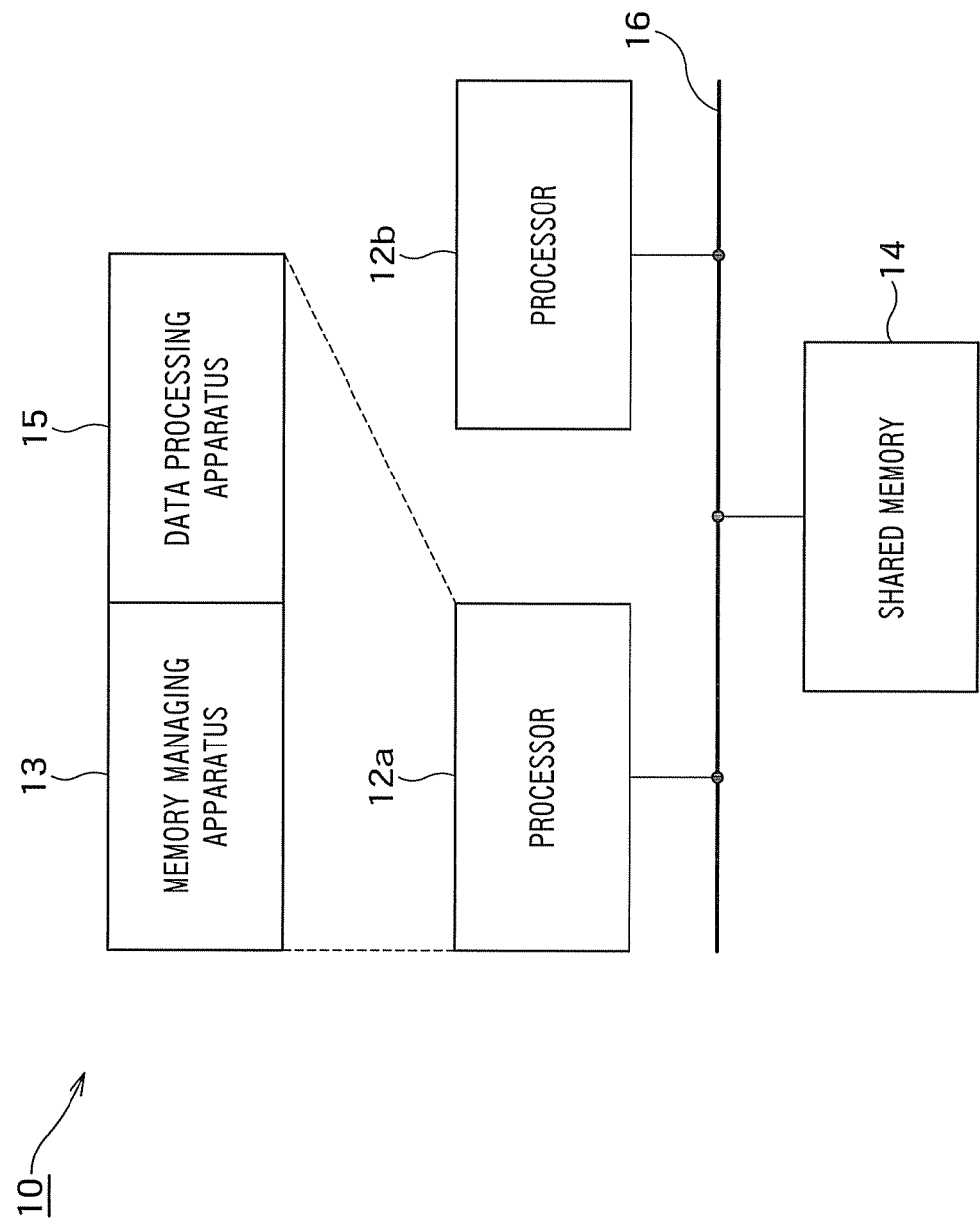
FIG. 1 is a block diagram illustrating a configuration of a multiprocessor system 10 of the embodiment.

A multiprocessor system according to an embodiment will be explained below. FIG. 1 is a block diagram illustrating a configuration of a multiprocessor system 10 of the embodiment.

The multiprocessor system 10 includes plural processors 12a and 12b, and a shared memory 14. The processors 12a and 12b are connected to a shared memory 14 through a connection line 16 such as a bus or interconnect. That is, the shared memory 14 is shared by the processors 12a and 12b.

Each of the processors 12a and 12b is a module that realizes a memory managing apparatus 13 and a data processing apparatus 15 by starting an application program stored in the shared memory 14. The processors 12a and 12b can execute plural applications in parallel.

Figure 2:
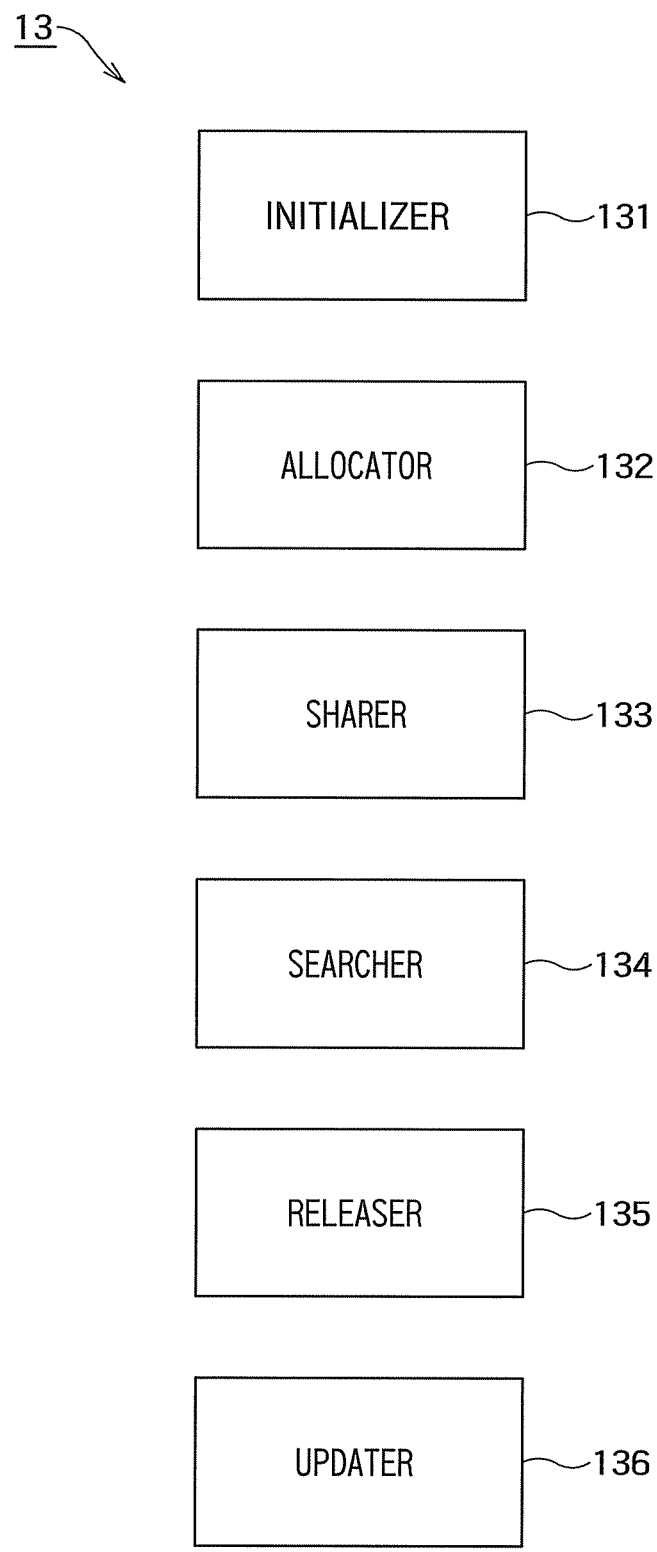
FIG. 2 is a block diagram illustrating a configuration of a memory managing apparatus 13.

The memory managing apparatus 13 manages the shared memory 14 shared by the plural processors 12a and 12b using a buddy system. FIG. 2 is a block diagram illustrating a configuration of a memory managing apparatus 13. The memory managing apparatus 13 includes an initializer 131, an allocator 132, a sharer 133, a searcher 134, a releaser 135, and an updater 136.

The data processing apparatus 15 performs data processing with respect to data stored in the shared memory 14. For example, the data processing apparatus 15 is an image processing apparatus that performs image processing to pieces of image data such as static image data and moving image data.

Various application programs and various pieces of data dealt with by the data processing apparatus 15 can be stored in the shared memory 14. For example, the shared memory 14 is a DRAM (Direct Random Access Memory).

Figure 3:
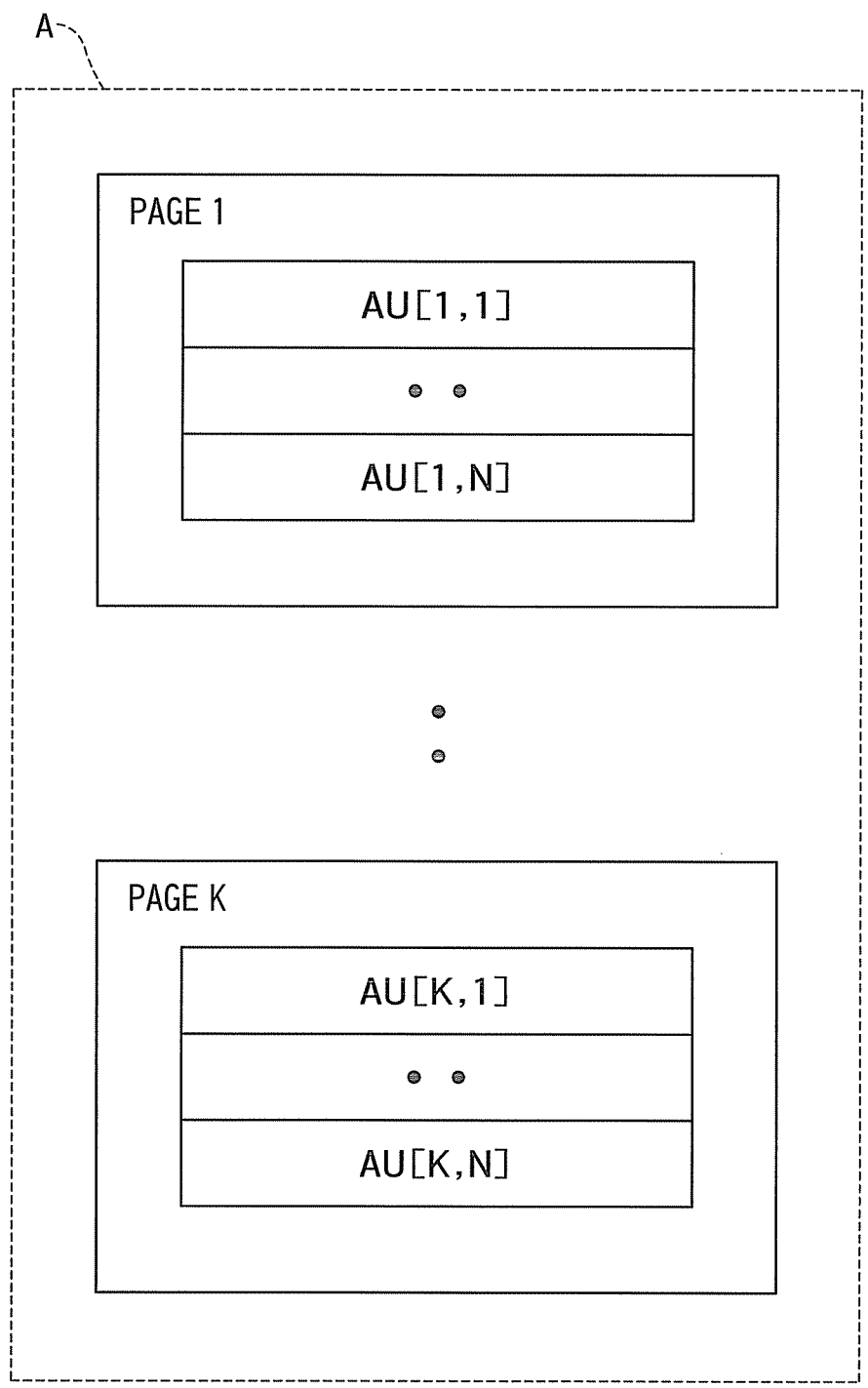
FIG. 3 is a schematic diagram illustrating a data structure of the allocation memory block A.
Figure 4:
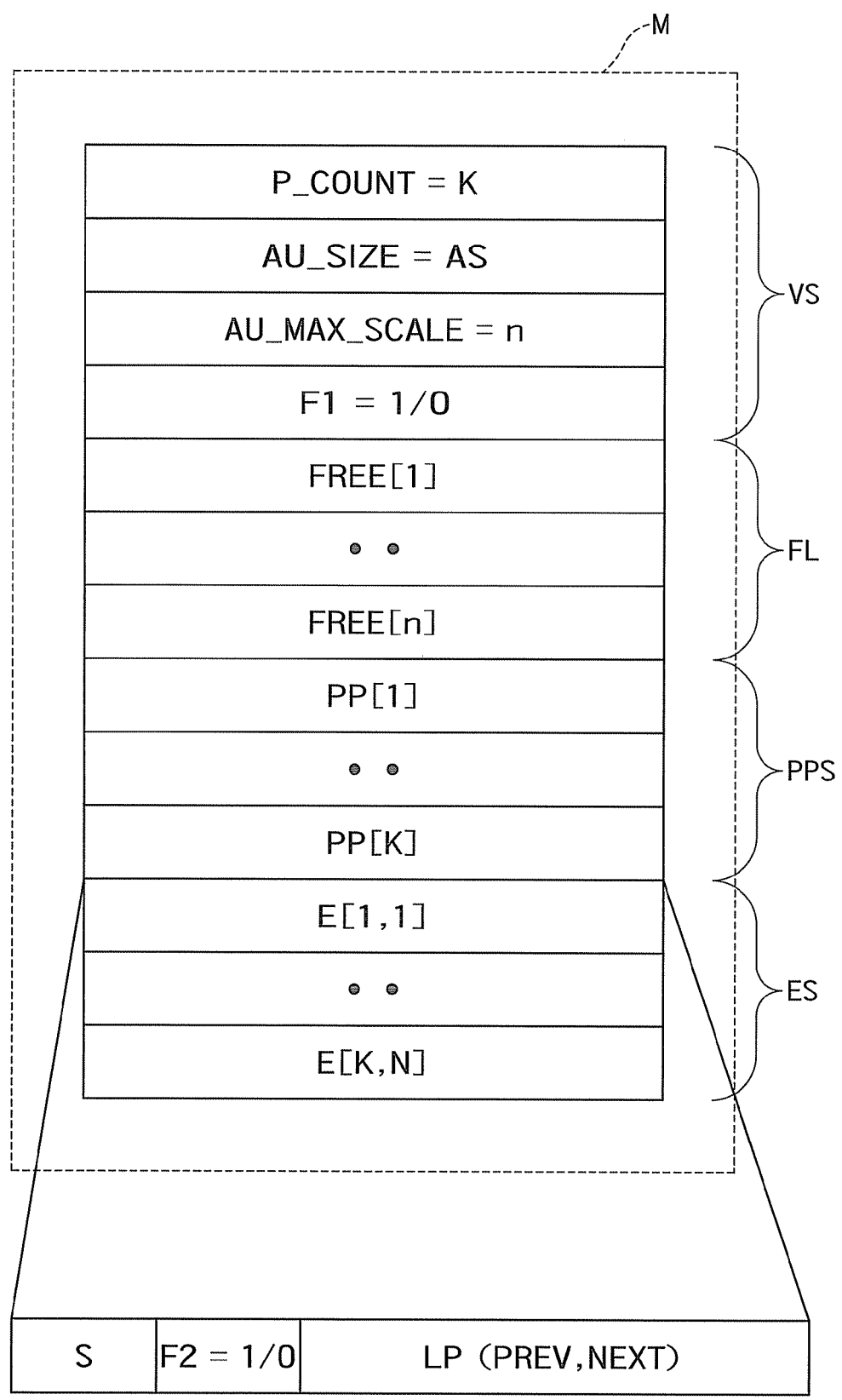
FIG. 4 is a schematic diagram illustrating a data structure of the management memory block M.

An allocation memory block A and a management memory block M are constructed on the shared memory 14. FIG. 3 is a schematic diagram illustrating a data structure of the allocation memory block A. FIG. 4 is a schematic diagram illustrating a data structure of the management memory block M. The allocation memory block A is one that is allocated to the data processing apparatus 15. The management memory block M is one that is used by the memory managing apparatus 13. The management memory block M and the allocation memory block A can be referred to by all the processors 12a and 12b.

The allocation memory block A includes plural pages. In each page, a memory area of the shared memory 14 is divided into predetermined page sizes PS. Each page may be constructed by continuous memory areas or discontinuous memory areas. Each page is divided into N (N=$2^n$) (n is a positive integer) fixed-length memories (hereinafter referred to as "allocation unit") AU[j,1] to AU[j,N] (j=1 to K, K is an integer of at least 2). The symbol "n" is a maximum scale of the allocation unit.

The management memory block M includes a variable section VS, a free list FL, a page pointer section PPS, and an entry section ES.

The variable section VS includes plural variables indicating information on the allocation memory block A. Specifically, the variable section VS includes a variable P_COUNT indicating a page count, a variable AU_SIZE indicating a size of the allocation unit, a variable AU_MAX_SCALE indicating the maximum scale of the allocation unit, and a lock flag F1 of the free list. A page count K is set to the variable P_COUNT. AS (AS=PS/N) is set to the variable AU_SIZE. The symbol n is set to the variable AU_MAX_SCALE. A value of 1 or 0 is set to the lock flag F1. The free list FL is locked when the value of the lock flag F1 is 1, and the free list FL is unlocked when the value of the lock flag F1 is 0.

The free list FL includes n pieces of free list information FREE[1] to FREE[n] in each scale of the allocation unit. Each of the pieces of free list information FREE[1] to FREE[n] indicates an allocatable memory area. For example, the free list information FREE[1] indicates the allocatable memory area when the number of allocation units of one page is $2^1$ (that is, when the allocation unit has the scale of 1), and the free list information FREE[n] indicates the allocatable memory area when the number of allocation units of one page is $2^n$ (that is, when the allocation unit has the maximum scale). Hereinafter, the free list information FREE[n] is referred to as "free list information for maximum scale".

The page pointer section PPS includes (K) page pointers PP[1] to PP[K] as many as the pages. A head address of each page of the allocation memory block A is set to each of the page pointers PP[1] to PP[K]. For example, a head address of page 1 is set to the page pointer PP[1], and a head address of page K is set to the page pointer PP[K].

The entry section ES includes (K×N) entries E[1,1] to E[K,N] as many as the allocation units. Each of the entries E[1,1] to E[K,N] corresponds one-on-one to the allocation unit. For example, the entry E[1,1] corresponds to the first allocation unit AU[1,1] of the page 1, and the entry E[K,N] corresponds to the Nth allocation unit AU[K,N] of page K.

Each of the entries E[1,1] to E[K,N] includes a variable S indicating a scale of the allocation units AU[1,1] to AU[K,N], an use flag F2, and a link pointer LP. A value of 1 or 0 is set to the use flag F2. When the value of the use flag F2 is 1, the allocation units AU[1,1] to AU[K,N] corresponding to the entries E[1,1] to E[K,N] are in use (not allocatable). When the value of the use flag F2 is 0, the allocation units AU[1,1] to AU[K,N] corresponding to the entries E[1,1] to E[K,N] are not in use (allocatable). The link pointer LP includes a first link pointer PREV and a second link pointer NEXT. A head address of an associated preceding entry is set to the first link pointer PREV. A head address of an associated subsequent entry is set to the second link pointer NEXT.

Figure 5:
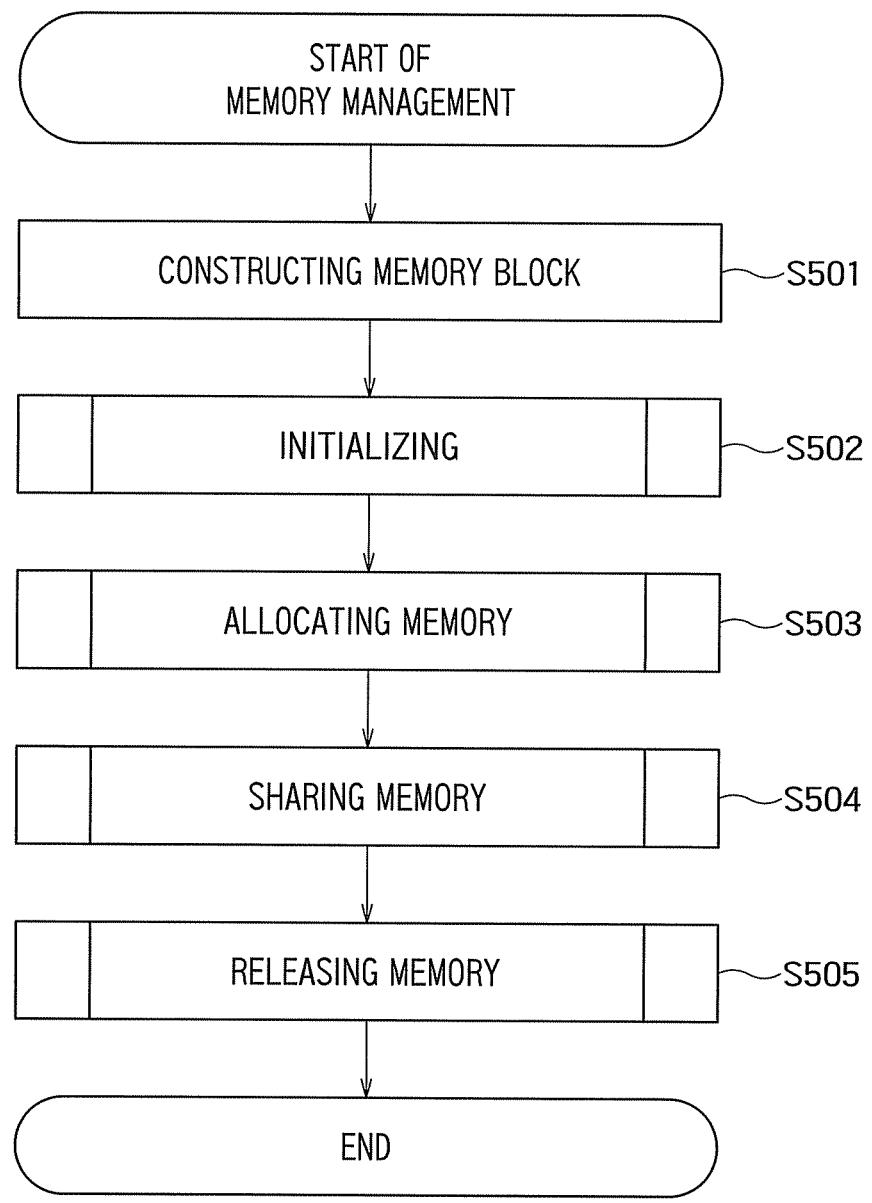
FIG. 5 is a flowchart illustrating a procedure of memory managing processing of the embodiment.

A memory managing apparatus of the embodiment will be explained below. FIG. 5 is a flowchart illustrating a procedure of memory managing processing of the embodiment.

<Constructing memory block (S501)> The memory managing apparatus 13 constructs the allocation memory block A and the management memory block M on the shared memory 14. At this point, values are set to the variable P_COUNT, variable AU_SIZE, variable AU_MAX_SCALE, and page pointers PP[1] to PP[K] of the management memory block M in response to the request from the data processing apparatus 15, respectively. No value is set to the lock flag F1.

Figure 6:
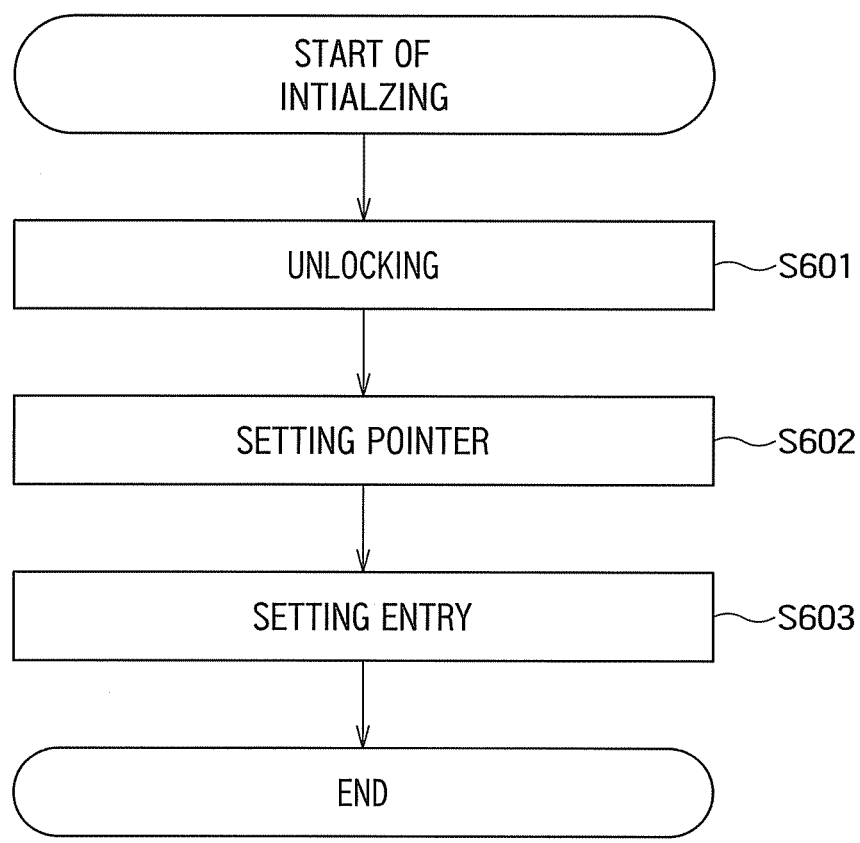
FIG. 6 is a flowchart illustrating a procedure of initializing (S502).

<Initializing (S502)> The initializer 131 initializes the management memory block M constructed in constructing memory block (S501). FIG. 6 is a flowchart illustrating a procedure of initializing (S502).

<Unlocking (S601)> The initializer 131 sets 0 (unlocking) to the lock flag F1 of the management memory block M.

<Setting pointer (S602)> The initializer 131 sets the pointer APNT[1,1] with respect to the first allocation unit AU[1,1] of page 1 to the free list information FREE[n] for maximum scale, and sets NULL (invalid value) to the pieces of free list information FREE[1] to FREE[n−1] except the free list information FREE[n] for maximum scale.

Figure 7:
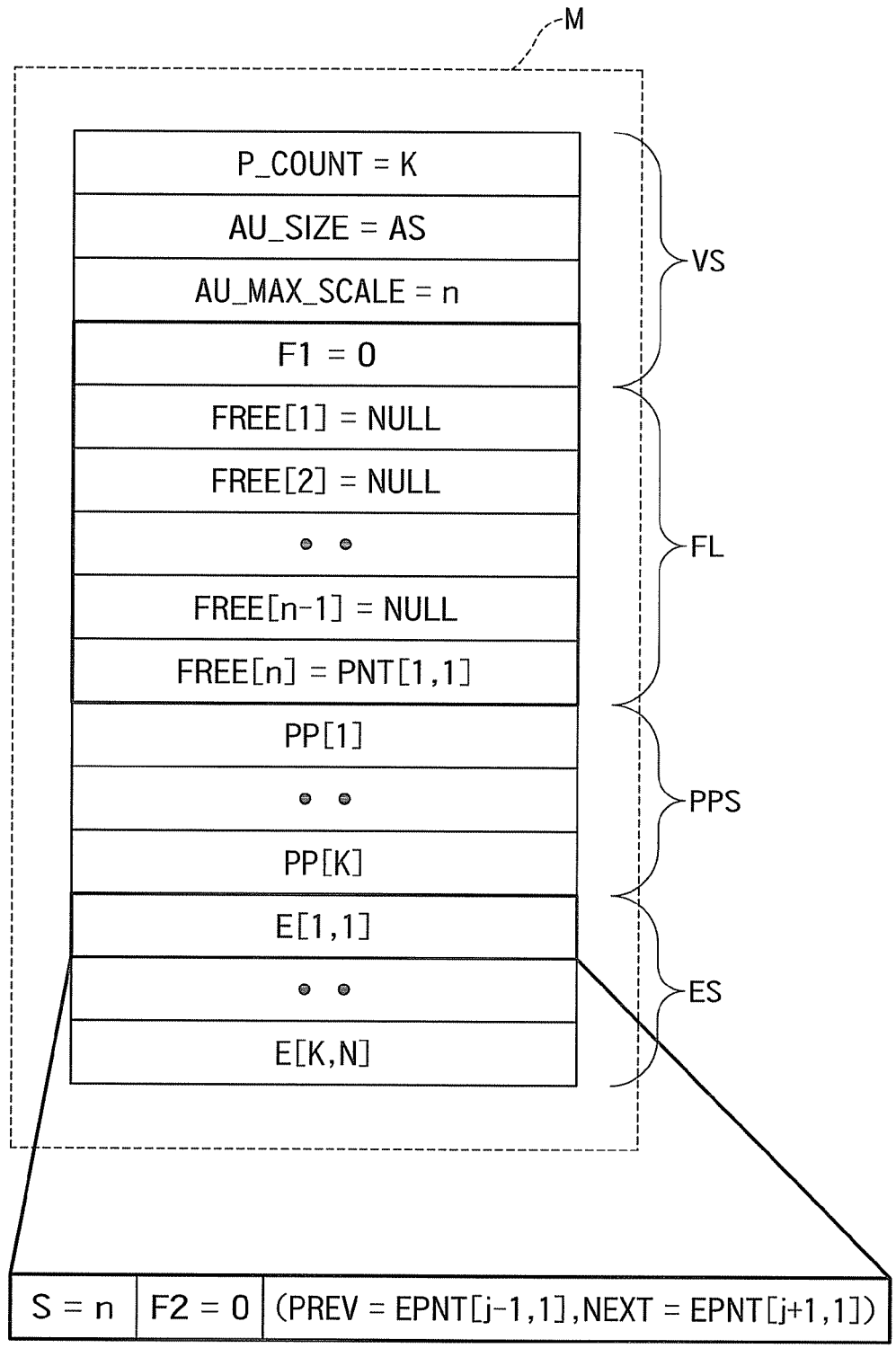
FIG. 7 is a schematic diagram illustrating the data structure of the management memory block M obtained in initializing (S502).

<Setting entry (S603)> The initializer 131 sets a predetermined value to the first entry E[j,1] of each page. Specifically, n is set to the variable S, 0 (unused) is set to the use flag F2, the pointer (hereinafter referred to as "entry pointer") EPNT[j−1,1] with respect to the first entry of the preceding page is set to the first link pointer PREV, and the pointer EPNT[j+1,1] with respect to the first entry of the subsequent page is set to the second link pointer NEXT. No value is set to the entries E[1,2] to E[j,N] of each page. Therefore, the management memory block M illustrated in FIG. 7 is obtained. FIG. 7 is a schematic diagram illustrating the data structure of the management memory block M obtained in initializing (S502). When setting entry (S603) is ended, initializing (S502) is ended and allocating memory (S503) is performed.

Figure 8:
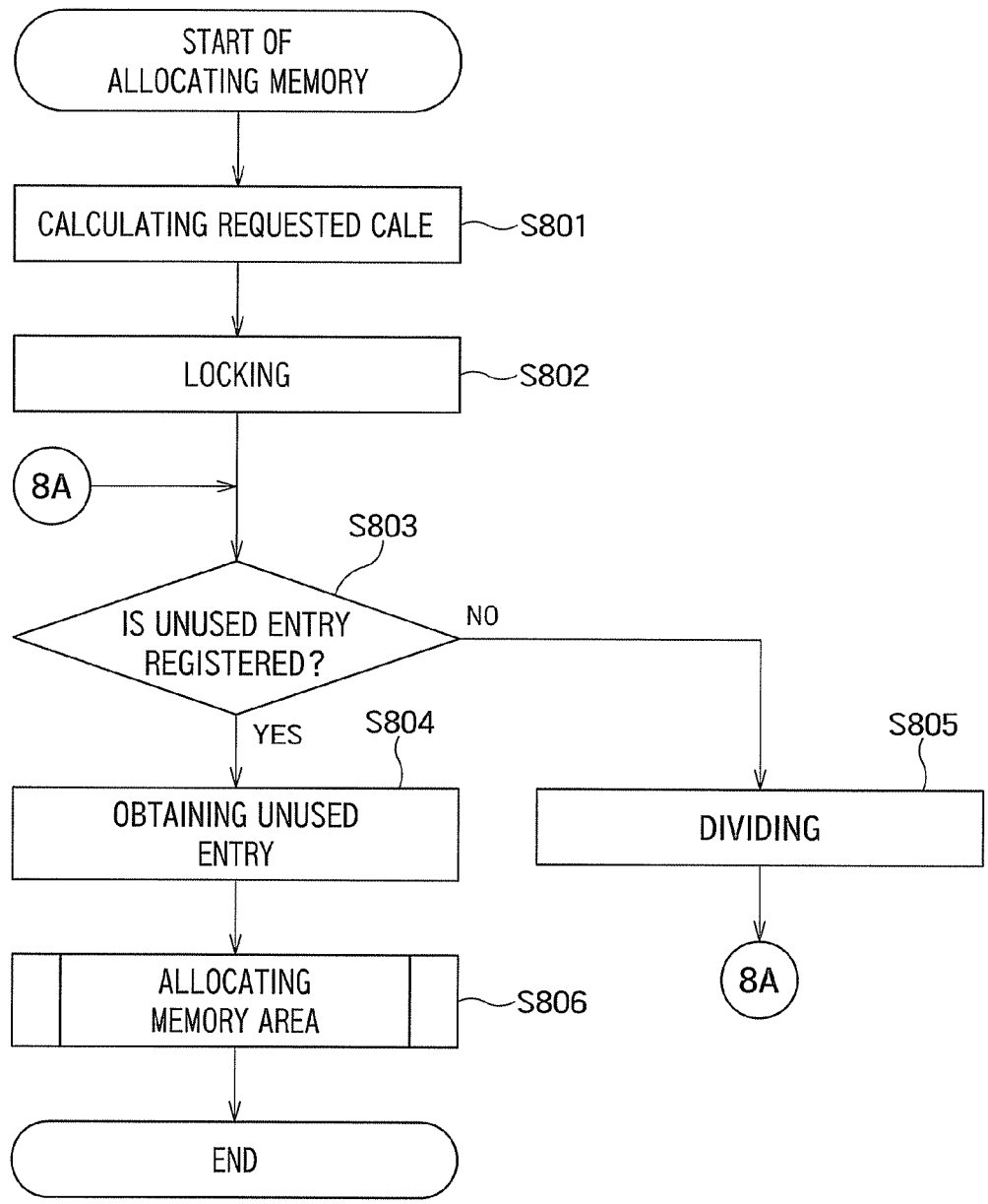
FIG. 8 is a flowchart illustrating a procedure of allocating memory (S503).

<Allocating memory (S503)> The allocator 132 allocates the memory area having the predetermined size to the data processing apparatus 15 in response to the request of the data processing apparatus 15. FIG. 8 is a flowchart illustrating a procedure of allocating memory (S503).

<Calculating requested scale (S801)> The allocator 132 calculates a requested scale REQ_S based on a size (hereinafter referred to as "requested size") REQ in a byte unit of the memory area requested by the data processing apparatus 15. The requested scale REQ_S is one that is necessary to secure the requested size REQ. That is, the allocator 132 converts the requested size REQ in the byte unit into the requested scale REQ_S in the scale unit. Specifically, the allocator 132 calculates a minimum value of x satisfying "REQ<$2^x \times$AS" of $2^0 \times$AS to $2^n \times$AS using the requested size REQ and the value AS of the variable AU_SIZE of FIG. 7. The symbol "x" means a scale that is necessary to secure the requested size REQ. The minimum value of x is the requested scale REQ_S.

<Locking (S802)> The allocator 132 sets 1 (locking) to the lock flag F1 of the management memory block M. In the case that 1 is set to the lock flag F1 before S802 (that is, the free list is used by another memory managing apparatus 13), the allocator 132 stands by until 0 (unlocking) is set to the lock flag F1, and sets 1 to the lock flag F1 after 0 is set to the lock flag F1.

<S803> The allocator 132 searches the entry (hereinafter referred to as "unused entry") in which 0 (unused) is set to the use flag F2 of the entries registered in the free list information FREE[REQ_S] corresponding to the requested scale REQ_S calculated in calculating requested scale (S801). When the unused entry is registered in the free list information FREE[REQ_S] (YES in S803), obtaining unused entry (S804) is performed. When the unused entry is not registered in the free list information FREE[REQ_S] (NO in S803), dividing (S805) is performed.

Figure 9:
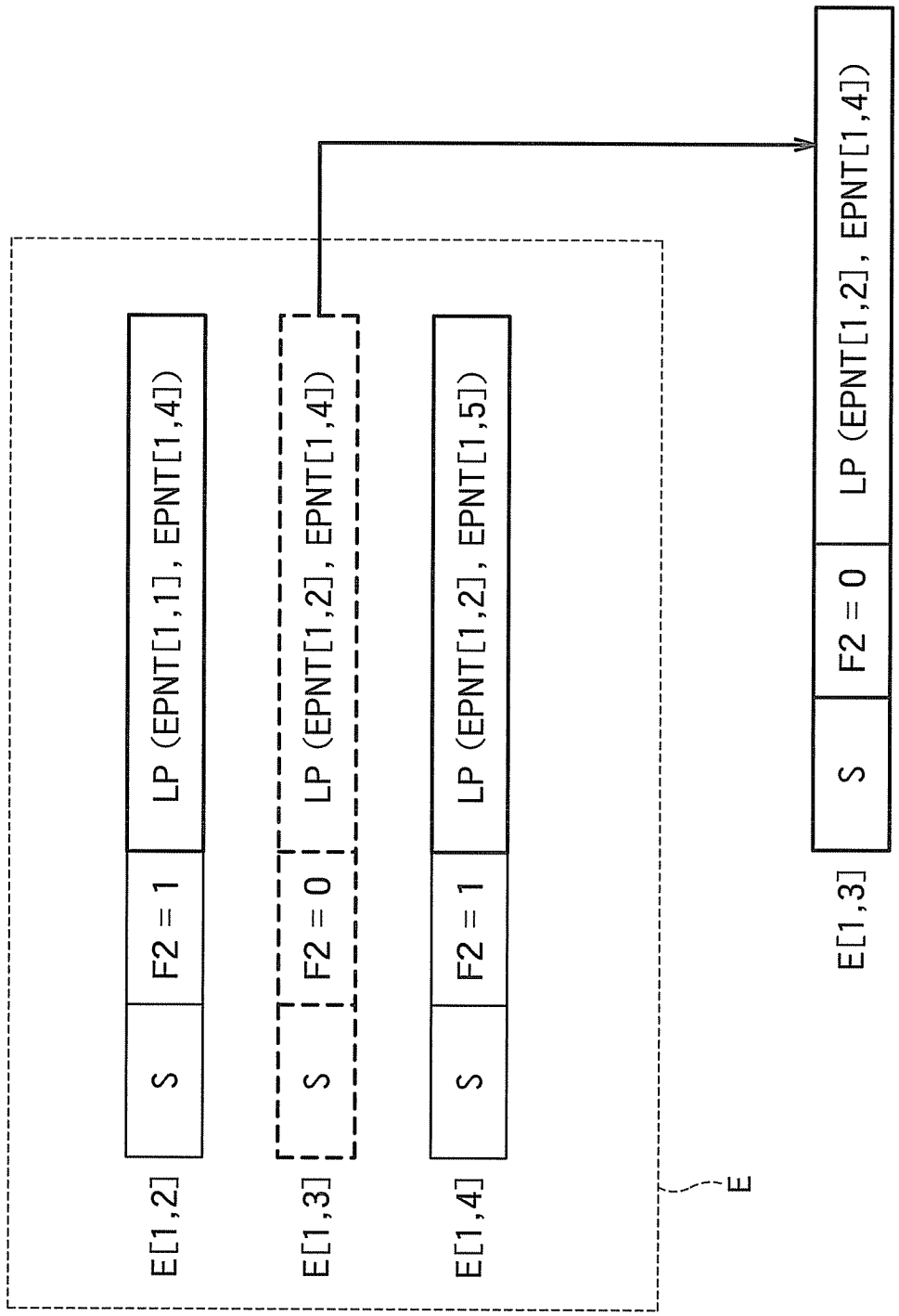
FIG. 9 is a schematic diagram illustrating a data structure of the entry E.
Figure 10:
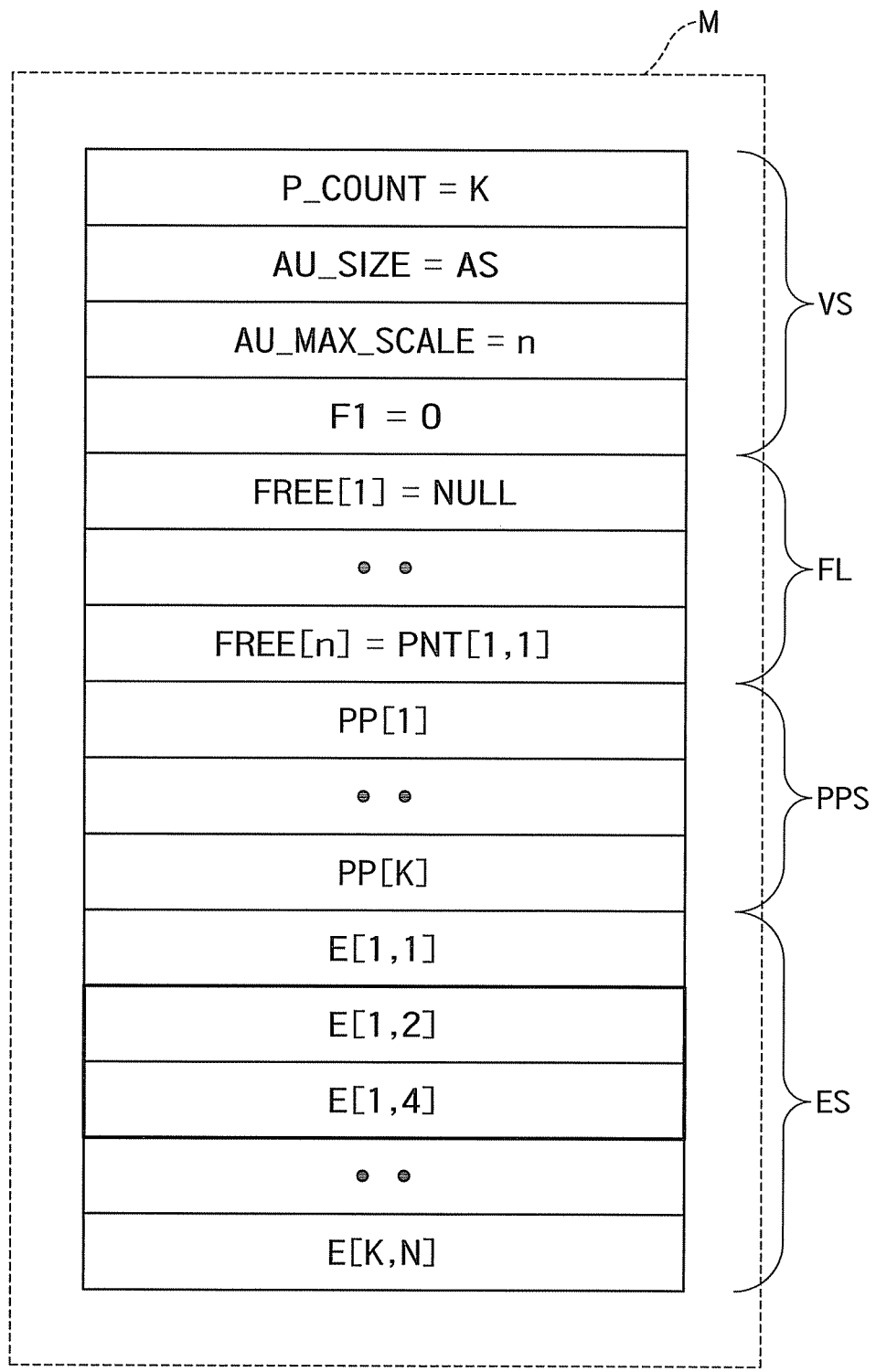
FIG. 10 is a schematic diagram illustrating a data structure of the management memory block M obtained in obtaining unused entry.

<Obtaining unused entry (S804)> The allocator 132 obtains the entry of a range indicated by the allocation unit corresponding to the lead unused entry of the free list of the unused entries registered in the free list information FREE[REQ_S] and the variable S of the first unused entry. FIG. 9 is a schematic diagram illustrating a data structure of the entry E. For example, as illustrated in FIG. 9, in the case that the third entry E[1,3] of page 1 is obtained, the allocator 132 sets the value EPNT[1,4] of the second link pointer NEXT of the entry E[1,3] to the second link pointer NEXT of the entry E[1,2] preceding the entry E[1,3], and sets the value EPNT [1,2] of the first link pointer PREV of the entry E[1,3] to the first link pointer PREV of the entry E[1,4] subsequent to the entry E[1,3]. In other words, the allocator 132 obtains the entry E[1,3] by rewriting the link pointers of the entries E[1,2] and E[1,3] preceding and subsequent to the entry E[1,3]. Then, the allocator 132 sets 0 to the lock flag F1 (that is, the free list is unlocked). Therefore, the management memory block M illustrated in FIG. 10 is obtained. FIG. 10 is a schematic diagram illustrating a data structure of the management memory block M obtained in obtaining unused entry.

<Dividing (S805)> The allocator 132 divides the allocation unit based on a pseudo code. FIG. 11 illustrates the pseudo code indicating a procedure of dividing. Specifically, the allocator 132 obtains an unused entry of the entries registered in the free list information (for example, free list information FREE[REQ_S+1]) corresponding to a scale (for example, scale REQ_S+1) that is larger than the scale (for example, requested scale REQ_S) referred to in S803 by 1, and divides the allocation unit corresponding to the unused entry. In other words, the allocator 132 divides the allocation unit satisfying the requested size with the scale that is larger than the scale referred to in S803 by 1. When dividing (S805) is ended, S803 is performed. When the unused entry does not exist even if a set of S803 and S805 is repeated, an error determination is made, 0 is set to the lock flag F1, and the memory managing processing is ended.

Figure 12:
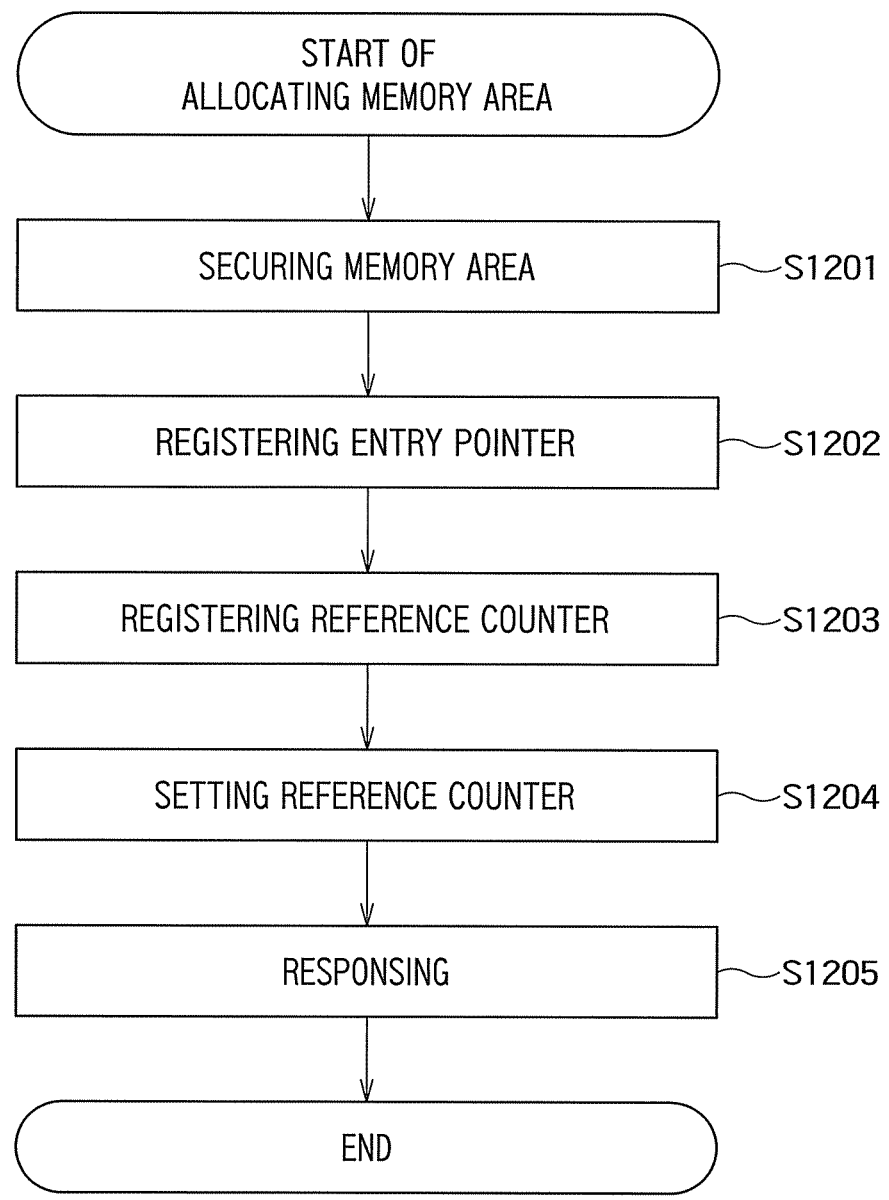
FIG. 12 is a flowchart illustrating a procedure of allocating memory area (S806).

<Allocating memory area (S806)> The allocator 132 allocates the memory area to the data processing apparatus 15 based on the unused entry obtained in obtaining unused entry (S804). FIG. 12 is a flowchart illustrating a procedure of allocating memory area (S806).

<Securing memory area (S1201)> The allocator 132 secures the memory area from a head address p corresponding to the unused entry obtained in obtaining unused entry (S804) to p+$2^{REQ\_S} \times$AS. That is, the secured memory area has the size of $2^{REQ\_S} \times$AS.

<Registering entry pointer (S1202)> The allocator 132 registers the entry pointer (that is, the head address of the unused entry) EPNT with respect to the unused entry in a tail end of the memory area secured in securing memory area (S1201). That is, the allocator 132 provides the entry pointer EPNT in the tail end of the memory area with respect to the entry corresponding to the allocation unit appropriate for the head address p of the memory area. Registering entry pointer (S1202) may be omitted.

<Registering reference counter (S1203)> The allocator 132 registers the reference counters (that is, the plural reference counters that correspond one-on-one to the plural processors 12a and 12b) as many as the pieces of the memory managing apparatus 13 in front of the entry pointer registered in registering entry pointer (S1202). For example, in the case that the processors 12a and 12b realize the pieces of the memory managing apparatus 13 (that is, two pieces of the memory managing apparatus 13 are realized), respectively, the reference counter RCa corresponds to the processor 12a, and the reference counter RCb corresponds to the processor 12b. At this point, 0 (initial value) is set to each of the plural reference counters RCa and ROD. In the case that registering entry pointer (S1202) is omitted, the plural reference counters are registered in the tail end of the memory area secured in securing memory area (S1201).

<Setting reference counter (S1204)> The allocator 132 sets 1 to the reference counter corresponding to the processor that realizes the memory managing apparatus 13 which is a target in allocating memory area (S806). For example, in the case that the memory managing apparatus 13 realized by the processor 12a is the target in allocating memory area, 1 is set to the reference counter RCa corresponding to the processor 12a.

Figure 13:
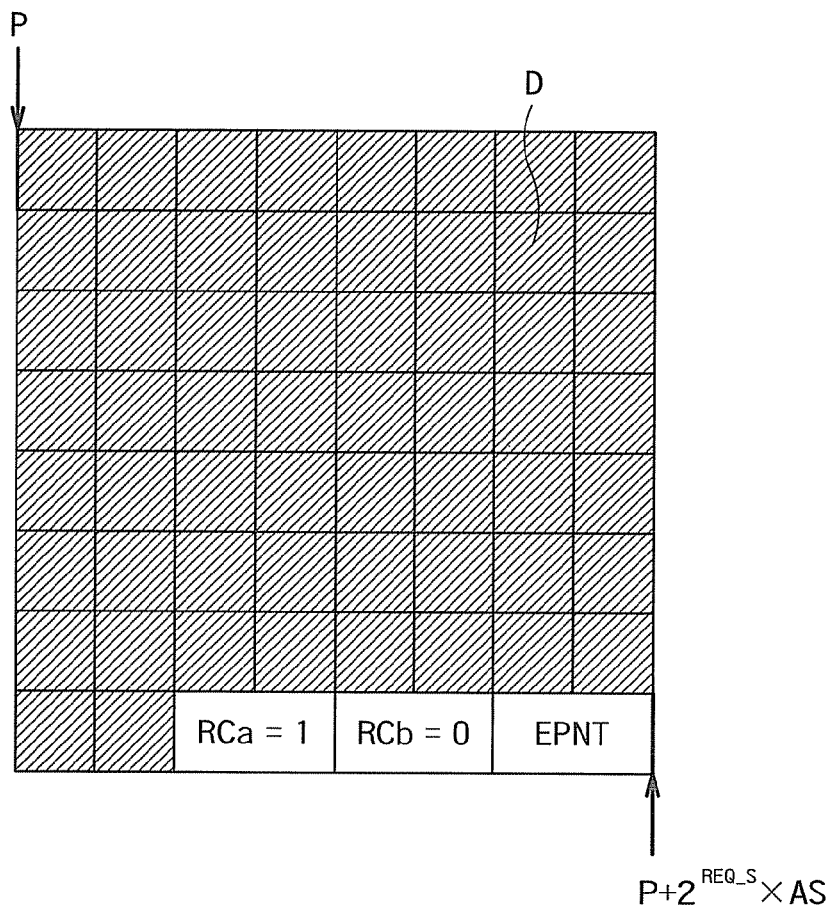
FIG. 13 is a schematic diagram illustrating a data structure of the memory area obtained in allocating memory area.

<Responding (S1205)> The allocator 132 issues a response to return the head address p corresponding to the unused entry obtained in obtaining unused entry (S804) to the data processing apparatus 15. Therefore, the memory area is allocated to the data processing apparatus 15. FIG. 13 is a schematic diagram illustrating a data structure of the memory area obtained in allocating memory area. As illustrated in FIG. 13, the memory area allocated to the data processing apparatus 15 includes a data block D in which the data (for example, image data) dealt with by the data processing apparatus 15 is stored, reference counters RCa and RCb that correspond to the processors 12a and 12b, and an entry pointer EPNT with respect to the unused entry. That is, based on the request of each of the processors 12a and 12b, the allocator 132 secures the memory area of the shared memory 14 allocated to each of the processors 12a and 12b, and provides the reference counters RCa and RCb which correspond one-on-one to the processors 12a and 12b, in each memory area. When responding (S1205) is ended, allocating memory (S503) is ended, and sharing memory (S504) is performed.

Figure 14:
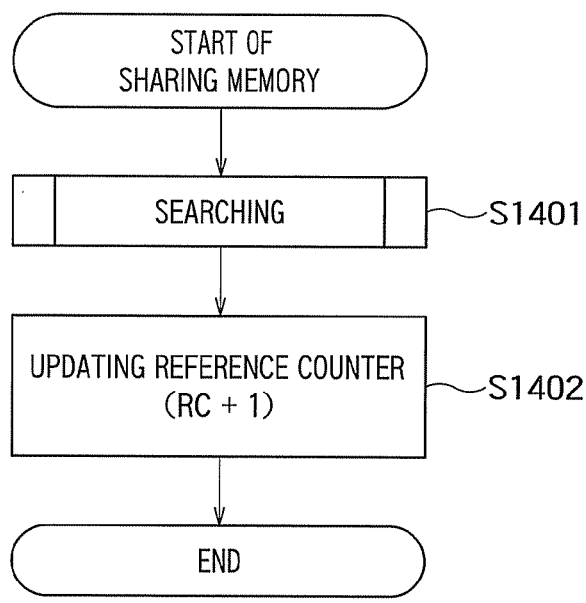
FIG. 14 is a flowchart illustrating a procedure of sharing memory (S504).

<Sharing memory (S504)> The sharer 133 enables the plural pieces of data processing apparatus 15 to share the allocated memory area in order to avoid data copy. FIG. 14 is a flowchart illustrating a procedure of sharing memory (S504).

Figure 15:
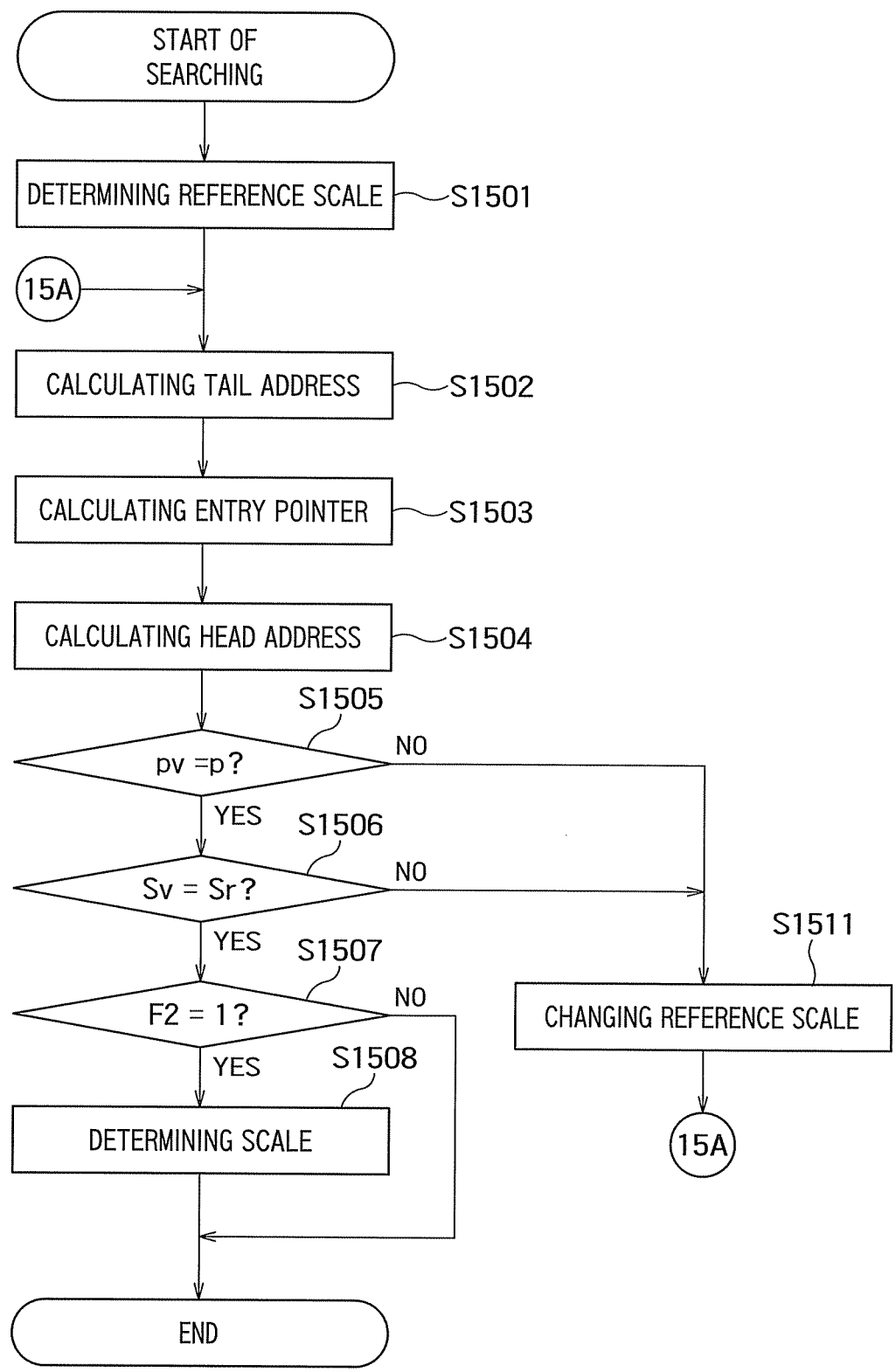
FIG. 15 is a flowchart illustrating a procedure of searching (S1401).

<Searching (S1401)> The searcher 134 searches the entry corresponding to the memory area that is allocated to the data processing apparatus 15 in allocating memory (S503). FIG. 15 is a flowchart illustrating a procedure of searching (S1401).

<Determining reference scale (S1501)> The searcher 134 determines a reference scale Sr. A value of the reference scale Sr is a minimum value of 1 of the scale or a maximum value of n of the scale. For example, the searcher 134 determines the reference scale Sr as n.

<Calculating tail address (S1502)> The searcher 134 calculates a tentative tail address qv of a tentative entry Ev corresponding to the reference scale Sr using the reference scale Sr determined in determining reference scale (S1501) and the head address p of the unused entry obtained in obtaining unused entry (S804).

<Calculating entry pointer (S1503)> The searcher 134 calculates a tentative entry pointer EPNTv with respect to the tentative entry Ev based on the tentative tail address qv calculated in calculating tail address (S1502).

Figure 16:
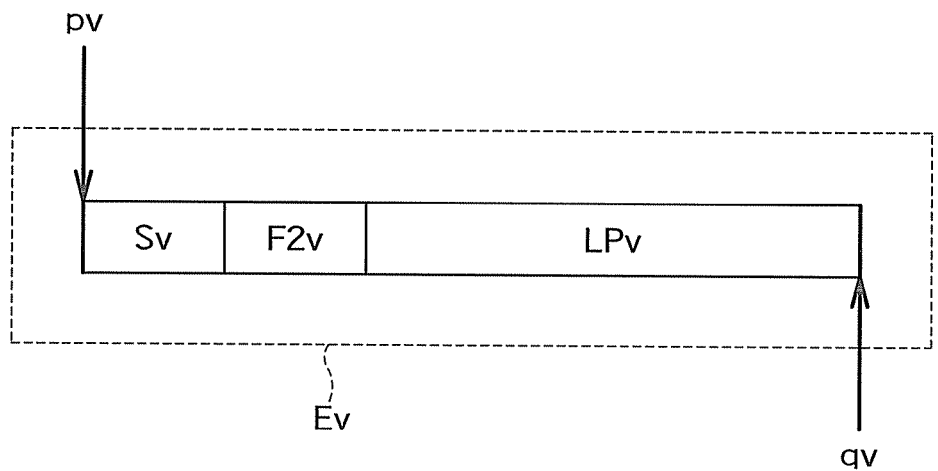
FIG. 16 is a schematic diagram illustrating a data structure of the tentative entry Ev obtained in calculating head address.

<Calculating head address (S1504)> The searcher 134 calculates a tentative head address pv of the tentative entry Ev using the tentative tail address qv calculated in calculating tail address (S1502), thereby obtaining the tentative entry Ev. FIG. 16 is a schematic diagram illustrating a data structure of the tentative entry Ev obtained in calculating head address. The tentative entry Ev includes a tentative scale Sv, a tentative use flag F2v, and a tentative link pointer LPv. The tentative head address pv and the tentative tail address qv mean that the tentative entry Ev is stored in a area from the tentative head address pv to the tentative tail address qv.

<S1505> The searcher 134 compares the tentative head address pv calculated in calculating head address (S1504) with the head address p of the unused entry obtained in obtaining unused entry (S804). When the tentative head address pv is matched with the head address p of the unused entry (YES in S1505), S1506 is performed. When the tentative head address pv is not matched with the head address p of the unused entry (NO in S1505), changing reference scale (S1511) is performed.

<S1506> The searcher 134 compares the reference scale Sr determined in determining reference scale (S1501) with the tentative scale Sv. When the tentative scale Sv is matched with the reference scale Sr (YES in S1506), S1507 is performed. When the tentative scale Sv is not matched with the reference scale Sr (NO in S1506), changing reference scale (S1511) is performed.

<S1507> The searcher 134 determines whether the value of the use flag F2 of the actual entry E corresponding to the tentative entry pointer EPNTv calculated in calculating entry pointer (S1503) is 1 or not. When such value is 1 (YES in S1507), determining scale (S1508) is performed. When such value 0 (NO in S1507), the memory managing processing is ended.

<Determining scale (S1508)> The searcher 134 determines the reference scale Sr determined in determining reference scale (S1501) as the scale corresponding to the head address p of unused entry obtained in obtaining unused entry (S804). That is, the searcher 134 determines the scale of the memory area based on the entry pointer EPNT. When determining scale (S1508) is ended, searching entry is ended, and updating reference counter (S1402) is performed.

<Changing reference scale (S1511)> The searcher 134 changes a value of a reference scale Sr. Specifically, the releaser 135 subtracts 1 from the value of the reference scale Sr or adds 1 to the value of the reference scale Sr. When changing reference scale (S1511) is ended, calculating tail address (S1502) is performed.

<Updating reference counter (S1402)> The updater 136 adds 1 to the value of the reference counter corresponding to the processor that realizes the memory managing apparatus 13. That is, when the memory area is allocated to each of the processors 12a and 12b, the updater 136 adds 1 to the value of the reference counter corresponding to the processor that manages the memory area. For example, in the case that the processor 12a realizes the memory managing apparatus 13, the updater 136 adds 1 to the value of the reference counter RCa corresponding to the processor 12a. When updating reference counter (S1402) is ended, sharing memory (S504) is ended, and releasing memory (S505) is performed.

Figure 17:
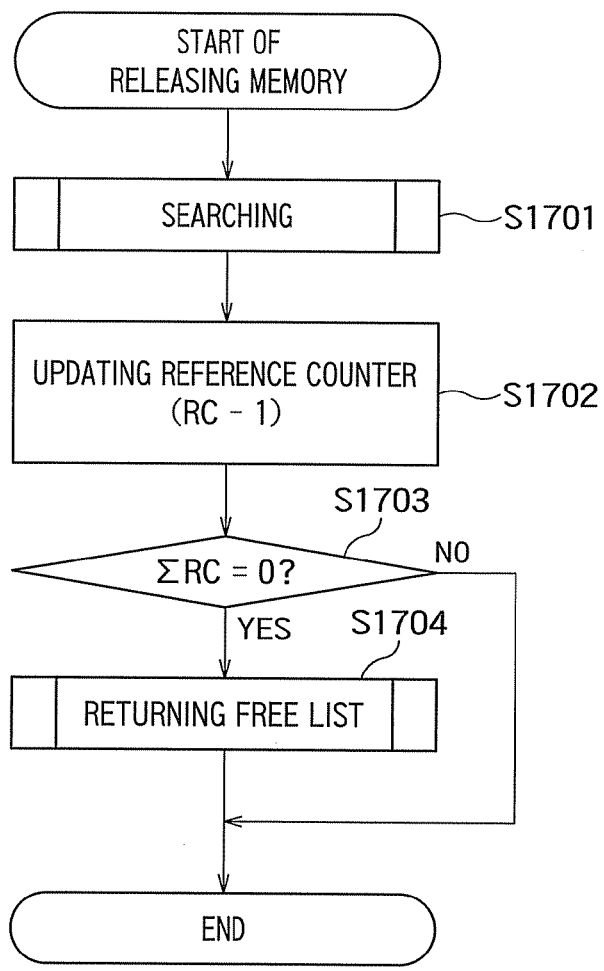
FIG. 17 is a flowchart illustrating a procedure of releasing memory (S505).

<Releasing memory (S505)> The releaser 135 releases the memory area from the data processing apparatus 15. FIG. 17 is a flowchart illustrating a procedure of releasing memory (S505).

<Searching (S1701)> The searcher 134 performs searching similarly to S1401.

<Updating reference counter (S1702)> The updater 136 subtracts 1 from the value of the reference counter corresponding to the processor that realizes the memory managing apparatus 13. That is, when the memory area is released from the processor to which the shared memory 14 is allocated, the updater 136 subtracts 1 from the value of the reference counter corresponding to the processor that manages the memory area. For example, in the case that the processor 12a realizes the memory managing apparatus 13, the updater 136 subtracts 1 from the value of the reference counter RCa corresponding to the processor 12a.

<S1703> The releaser 135 determines whether a sum of the values of all the reference counters (for example, reference counters RCa and RCb) is 0 or not. When the sum is 0 (YES in S1703), returning free list (S1704) is performed. When the sum is not 0 (NO in S1703), the memory managing processing is ended. That is, when the sum of the values of the plural reference counters in the memory area updated by the updater 136 is 0, the releaser 135 releases the memory area from the processor to which the memory area is allocated.

Figure 18:
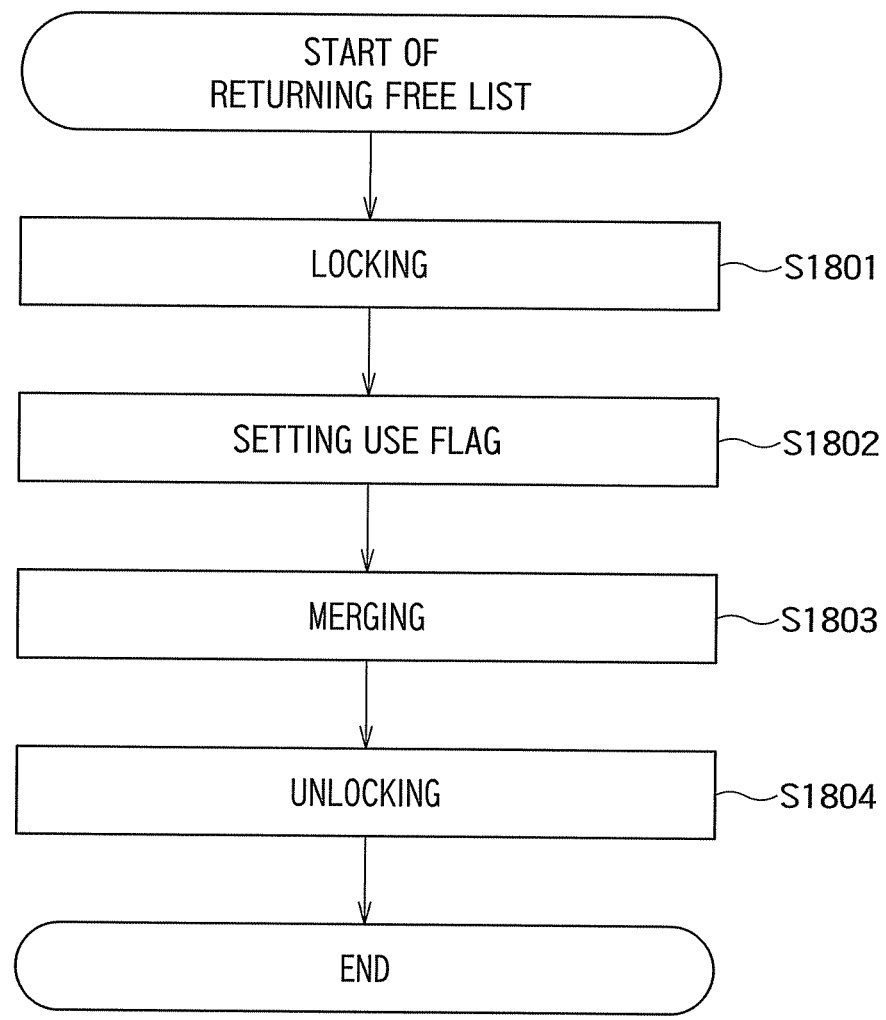
FIG. 18 is a flowchart illustrating a procedure of returning free list (S1704).

<Returning free list (S1704)> The releaser 135 returns the free list. FIG. 18 is a flowchart illustrating a procedure of returning free list (S1704).

<Locking (S1801)> The releaser 135 sets the lock flag F1 to 1 (locking). When 1 is set to the lock flag F1 (that is, the free list is used by another memory managing apparatus 13), the releaser 135 stands by until 0 (unlocking) is set to the lock flag F1, and sets 1 to the lock flag F1 after 0 is set to the lock flag F1.

<Setting use flag (S1802)> The releaser 135 sets 0 (unused) to the use flag F2 of the actual entry E corresponding to a tentative entry pointer EPNTv.

<Merging (S1803)> The releaser 135 merges the allocation units based on the pseudo code. FIG. 19 illustrates the pseudo code indicating a procedure of merging. The pseudo code of FIG. 19 indicates that merging is performed by processing the reverse of dividing (S805) indicated by the pseudo code of FIG. 11.

<Unlocking (S1804)> The releaser 135 sets the lock flag F1 to 0. When unlocking is ended, the memory managing processing is ended.

At least a portion of a memory managing apparatus 13 according to the above-described embodiments may be composed of hardware or software. When at least a portion of the memory managing apparatus 13 is composed of software, a program for executing at least some functions of the memory managing apparatus 13 may be stored in a recording medium, such as a flexible disk or a CD-ROM, and a computer may read and execute the program. The recording medium is not limited to a removable recording medium, such as a magnetic disk or an optical disk, but it may be a fixed recording medium, such as a hard disk or a memory.

In addition, the program for executing at least some functions of the memory managing apparatus 13 according to the above-described embodiment may be distributed through a communication line (which includes wireless communication) such as the Internet. In addition, the program may be encoded, modulated, or compressed and then distributed by wired communication or wireless communication such as the Internet. Alternatively, the program may be stored in a recording medium, and the recording medium having the program stored therein may be distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A processor sharing a shared memory shared by a plurality of processors, the shared memory comprising an allocation memory block and a management memory block, the processor comprising:
   an allocator configured to secure a memory area in the shared memory allocated to each of the processors based on a request of each of the processors, and register a plurality of reference counters corresponding one-to-one to the processors;
   an updater configured to add 1 to a value of the reference counter corresponding to the processor managing the memory area when the memory area is allocated to each of the processors and subtract 1 from the value of the reference counter corresponding to the processor managing the memory area when the memory area is released from the processor to which the memory area is allocated;
   a releaser configured to release the memory area from the processor to which the memory area is allocated when a sum of the values of the reference counters in the memory area updated by the updater is 0; and
   a searcher configured to determine a scale of the memory area,
   wherein in a tail end of the memory area, the allocator registers an entry pointer with respect to an entry corresponding to an allocation unit appropriate for a head address of the memory area and the reference counters in front of the entry pointer, and
   wherein the searcher determines a reference scale, calculates a tentative tail address of a tentative entry corresponding to the reference scale using the reference scale and a head address of an unused entry, calculates a tentative entry pointer with respect to the tentative entry and a tentative head address of the tentative entry based on the tentative tail address, compares a set of the tentative head address and the head address of the unused entry with a set of the reference scale and a tentative scale of the tentative entry, and determines the scale of the memory area.

2. The processor of claim 1, wherein the allocator registers the reference counters in a tail end of the memory area.

3. The processor of claim 1, wherein the searcher determines the reference scale as the scale of the memory area when the set of the tentative head address and the head address of the unused entry is matched with the set of the reference scale and the tentative scale.

4. The processor of claim 1, wherein the shared memory comprises an allocation memory block and a management memory block, and
   the allocator sets a head address of each page of the allocation memory block, a scale of an allocation unit and free list information indicative of an allocatable memory area in each scale of the allocation unit into the management memory block.

5. A multiprocessor system comprising:
   a shared memory comprising a allocation memory block and a management memory block; and
   a plurality of processors configured to share the shared memory, wherein each of the processors comprises:
   an allocator configured to secure a memory area in the shared memory allocated to each of the processors based on a request of each of the processors, and register a plurality of reference counters corresponding one-to-one to the processors;
   an updater configured to add 1 to a value of the reference counter corresponding to the processor managing the memory area when the memory area is allocated to each of the processors and subtract 1 from the value of the reference counter corresponding to the processor managing the memory area when the memory area is released from the processor to which the memory area is allocated;
   a releaser configured to release the memory area from the processor to which the memory area is allocated when a sum of the values of the reference counters in the memory area updated by the updater is 0; and
   a searcher configured to determine a scale of the memory area,
   wherein in a tail end of the memory area, the allocator registers an entry pointer with respect to an entry corresponding to an allocation unit appropriate for a head address of the memory area and the reference counters in front of the entry pointer, and
   wherein the searcher determines a reference scale, calculates a tentative tail address of a tentative entry corresponding to the reference scale using the reference scale and a head address of an unused entry, calculates a tentative entry pointer with respect to the tentative entry and a tentative head address of the tentative entry based on the tentative tail address, compares a set of the tentative head address and the head address of the unused entry with a set of the reference scale and a tentative scale of the tentative entry, and determines the scale of the memory area.

6. The system of claim 5, wherein the allocator registers the reference counters in a tail end of the memory area.

7. The system of claim 5, wherein the searcher determines the reference scale as the scale of the memory area when the set of the tentative head address and the head address of the unused entry is matched with the set of the reference scale and the tentative scale.

8. The system of claim 5, wherein the shared memory comprises an allocation memory block and a management memory block, and the allocator sets a head address of each page of the allocation memory block, a scale of an allocation unit and free list information indicative of an allocatable memory area in each scale of the allocation unit into the management memory block.

9. A method for causing a memory managing apparatus to manage a shared memory shared by a plurality of processors, the method comprising:

securing a memory area in the shared memory allocated to each of the processors based on a request of each of the processors;

registering a plurality of reference counters corresponding one-to-one to the processors;

adding 1 to a value of the reference counter corresponding to the processor managing the memory area when the memory area is allocated to each of the processors;

subtracting 1 from the value of the reference counter corresponding to the processor managing the memory area when the memory area is released from the processor to which the memory area is allocated;

releasing the memory area from the processor to which the memory area is allocated when a sum of the values of the reference counters in the memory area updated by the updater is 0; and determining a scale of the memory area, wherein in a tail end of the memory area, an entry pointer with respect to an entry corresponding to an allocation unit appropriate for a head address of the memory area and the reference counters in front of the entry pointer are registered, and wherein in determining the scale, a reference scale is determined, a tentative tail address of a tentative entry corresponding to the reference scale is calculated using the reference scale and a head address of an unused entry, a tentative entry pointer with respect to the tentative entry and a tentative head address of the tentative entry are calculated based on the tentative tail address, a set of the tentative head address and the head address of the unused entry is compared with a set of the reference scale and a tentative scale of the tentative entry to determine the scale of the memory area.

10. The method of claim 9, wherein the reference counters in a tail end of the memory area are registered.

11. The method of claim 9, wherein in determining the scale, the reference scale is determined as the scale of the memory area when the set of the tentative head address and the head address of the unused entry is matched with the set of the reference scale and the tentative scale.

* * * * *